(12) United States Patent
De Villiers

(10) Patent No.: US 6,788,758 B2
(45) Date of Patent: Sep. 7, 2004

(54) METHOD OF RECONSTRUCTING TOMOGRAPHIC IMAGES

(75) Inventor: Mattieu Stefan De Villiers, Cape Town (ZA)

(73) Assignee: African Medical Imaging (Proprietary) Limited, Cape Town (ZA)

(*) Notice: Subject to any disclaimer, the term of this patent is extended or adjusted under 35 U.S.C. 154(b) by 0 days.

(21) Appl. No.: 10/466,496

(22) PCT Filed: Jan. 17, 2002

(86) PCT No.: PCT/IB02/00114

§ 371 (c)(1),
(2), (4) Date: Jul. 16, 2003

(87) PCT Pub. No.: WO02/058009

PCT Pub. Date: Jul. 25, 2002

(65) Prior Publication Data

US 2004/0066910 A1 Apr. 8, 2004

(30) Foreign Application Priority Data

Jan. 17, 2001 (ZA) .............................................. 01/0482

(51) Int. Cl.[7] .................................................. A61B 6/03
(52) U.S. Cl. ......................................... 378/4; 378/901
(58) Field of Search ........................... 378/4, 8, 15, 19, 378/901

(56) References Cited

U.S. PATENT DOCUMENTS 5,270,926 A * 12/1993 Tam .............................. 378/4
5,744,802 A * 4/1998 Muehllehner et al. . 250/363.03
6,242,743 B1 * 6/2001 DeVito et al. ......... 250/363.05

* cited by examiner

Primary Examiner—David V Bruce
(74) Attorney, Agent, or Firm—Kelly Lowry & Kelley, LLP

(57) ABSTRACT

A method of reconstructing a tomographic image of an object from incomplete projection data using a limited angle tomography technique. The method includes using the protection data to obtain a first reconstruction of the image. Thereafter, regions in the first reconstruction that can be predicted with an acceptable degree of certainty in a final reconstruction, are identified. Prior knowledge in the form of possible density levels and piece-wise smoothness that regions in an image can assume, are applied to those regions of acceptable certainty in the first reconstruction so as to obtain a second reconstruction. The projection data is then applied to projections of the second reconstruction using a constraining method to obtain a third reconstruction. In the same way regions of acceptable certainty are identified and the prior knowledge and the projection data are applied to the third reconstruction and subsequent reconstructions until a final reconstruction is achieved.

9 Claims, 6 Drawing Sheets

METHOD OF RECONSTRUCTING TOMOGRAPHIC IMAGES

FIELD OF INVENTION

THIS INVENTION relates particularly to a method of reconstructing tomographic images which can be used, for example, in radiological applications.

BACKGROUND TO INVENTION

The tomographic reconstruction of an object's density distribution from its projections which are images of the object taken from different directions, is of particular interest in the medical field and other fields including electron microscopy, astronomy, geology and non-destructive testing.

In many instances it is impossible to acquire usable projection measurements over a full 360° angular range. Furthermore, in medical applications, the exposure of patients to X-ray radiation should be minimised. It is also time-consuming, expensive and may require a large amount of resources to acquire a complete data set. In the case of electron microscopy, the density distribution may be such that X-rays will be attenuated in certain angular ranges, thereby resulting in a poor signal to noise ratio for those projections.

The abovementioned problems encourage the use of tomographic image reconstruction techniques which make use of incomplete projection data, such as limited angle tomography.

In limited angle tomography, the angular range of available projections is restricted. The required number of projections and the minimum angular range for performing a reconstruction will depend on the complexity of the image to be reconstructed. A number of problems have been identified with existing limited angle tomography reconstruction techniques. Existing techniques make use of iterative methods wherein prior knowledge is applied in the same way to each pixel (image element) without regard to its location in the image. The prior knowledge is typically in the form of space invariant information such as prior knowledge of the possible density levels or piece-wise smoothness that regions of the object can assume.

The problem with this approach wherein the prior knowledge is applied to each pixel in the same way, is that it forces certain pixels to assume values that are incorrect in the final reconstruction. This leads to poor quality reconstructions having an unacceptably high visibility of distortions particularly in the case of severely limited angular ranges of measured projections. Existing techniques also do not teach how to recover unmeasured edge information when the angular range of measured projections is increasingly reduced.

It is an object of the present invention to ameliorate many of the problems associated with existing limited angle tomographic reconstruction techniques.

Any reference hereinafter to "limited angle tomography" must be interpreted to mean the reconstruction of tomographic images wherein the angular range of available projections is restricted.

Any reference hereinafter to "prior knowledge" must be interpreted to mean space invariant information on at least one of a group consisting of possible density levels and piece-wise smoothness that regions of an object for which a tomographic image is to be reconstructed, can assume.

SUMMARY OF INVENTION

According to a first aspect of the invention there is provided a method of reconstructing a tomographic image of an object from incomplete projection data using a limited angle tomography technique, the method including the steps of:

using the projection data to obtain a first reconstruction of the image;

creating an intermediate image in which each pixel represents the probability that a corresponding pixel of the first reconstruction of the image resembles the corresponding pixel of a final reconstruction of the image;

based on the intermediate image, identifying regions in the first reconstruction of the image that resemble their final reconstruction;

applying prior knowledge only to said regions in the first reconstruction of the image that resemble their final reconstruction, to obtain a second reconstruction of the image which is more accurate than the first reconstruction;

applying the projection data to projections of the second reconstruction of the image by constraining the projections of the second reconstruction of the image to the projection data, to obtain a third reconstruction of the image which is more accurate than the second reconstruction; and iteratively creating intermediate images, identifying regions in the third reconstruction of the image and subsequent reconstructions of the image, that resemble their final reconstruction and applying the prior knowledge and the projection data in the same way to the third reconstruction of the image and subsequent reconstructions thereof until a final reconstruction is achieved.

The method may include iteratively applying the projection data to projections of reconstructions of the image by constraining the projections to the projection data using an iterative update equation method wherein the resultant error obtained between calculated projections of each reconstruction and the projection data is repeatedly back-projected onto the reconstructions so that the error decreases in subsequent reconstructions of the image.

The method may include applying the prior knowledge to reconstructions of the image by thresholding preselected pixels to the closest intensity value.

According to a second aspect of the invention there is provided a computer program product for reconstructing a tomographic image of an object from incomplete projection data using a limited angle tomography technique, the computer program product including program instructions for:

using the projection data to obtain a first reconstruction of the image;

creating an intermediate image in which each pixel represents the probability that a corresponding pixel of the first reconstruction of the image resembles the corresponding pixel of a final reconstruction of the image;

based on the intermediate image, identifying regions in the first reconstruction of the image that resemble their final reconstruction;

applying prior knowledge only to said regions in the first reconstruction of the image that resemble their final reconstruction, to obtain a second reconstruction of the image which is more accurate than the first reconstruction;

applying the projection data to projections of the second reconstruction of the image by constraining the projections of the second reconstruction of the image to the projection data, to obtain a third reconstruction of the image which is more accurate than the second reconstruction; and iteratively creating intermediate images, identifying regions in the third reconstruction of the image and subsequent reconstructions of the image, that resemble their final reconstruction and applying the prior knowledge and the projection data in the same way to the third reconstruction of the image and subsequent reconstructions thereof until a final reconstruction is achieved.

The computer program product may include program instructions for iteratively applying the projection data to projections of reconstructions of the image by constraining the projections to the projection data using an iterative update equation method wherein the resultant error obtained between calculated projections of each reconstruction and the projection data is repeatedly back-projected onto the reconstructions so that the error decreases in subsequent reconstructions of the image.

The computer program product may include program instructions for applying the prior knowledge to reconstructions of the image by thresholding preselected pixels to the closest intensity value.

According to a third aspect of the invention there is provided processing means having software executable thereon for reconstructing a tomographic image of an object from incomplete projection data using a limited angle tomography technique, the software being configured to:

use the projection data to obtain a first reconstruction of the image;

create an intermediate image in which each pixel represents the probability that a corresponding pixel of the first reconstruction of the image resembles the corresponding pixel of a final reconstruction of the image;

based on the intermediate image, identify regions in the first reconstruction of the image that resemble their final reconstruction;

apply prior knowledge only to said regions in the first reconstruction of the image that resemble their final reconstruction, to obtain a second reconstruction of the image which is more accurate than the first reconstruction;

apply the projection data to projections of the second reconstruction of the image by constraining the projections of the second reconstruction of the image to the projection data, to obtain a third reconstruction of the image which is more accurate than the second reconstruction; and iteratively create intermediate images, identify regions in the third reconstruction of the image and subsequent reconstructions of the image, that resemble their final reconstruction and apply the prior knowledge and the projection data in the same way to the third reconstruction of the image and subsequent reconstructions thereof until a final reconstruction is achieved.

The software executable thereon may be configured to iteratively apply the projection data to projections of reconstructions of the image by constraining the projections to the projection data using an iterative update equation method reconstruction and the projection data is repeatedly back-projected onto the reconstructions so that the error decreases in subsequent reconstructions of the image.

The software may be configured to apply the prior knowledge to reconstructions of the image by thresholding preselected pixels to the closest intensity value.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DETAILED DESCRIPTION OF THE DRAWINGS

Figure 1:
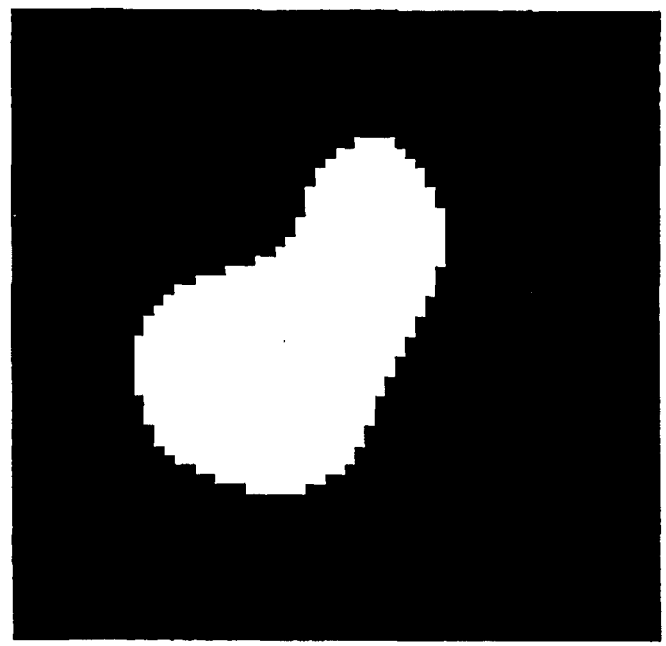
FIG. 1 shows a 64×64 pixel binary phantom image that is to be reconstructed in accordance with the invention.
Figure 2:
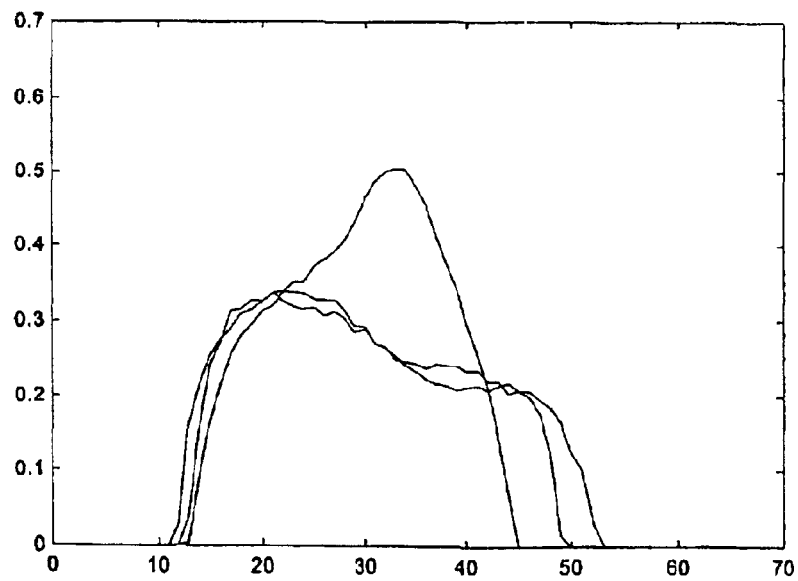
FIG. 2 shows graphically the three fan beam projections of the binary phantom image of FIG. 1, that are to be used to reconstruct the phantom image.
Figure 3:
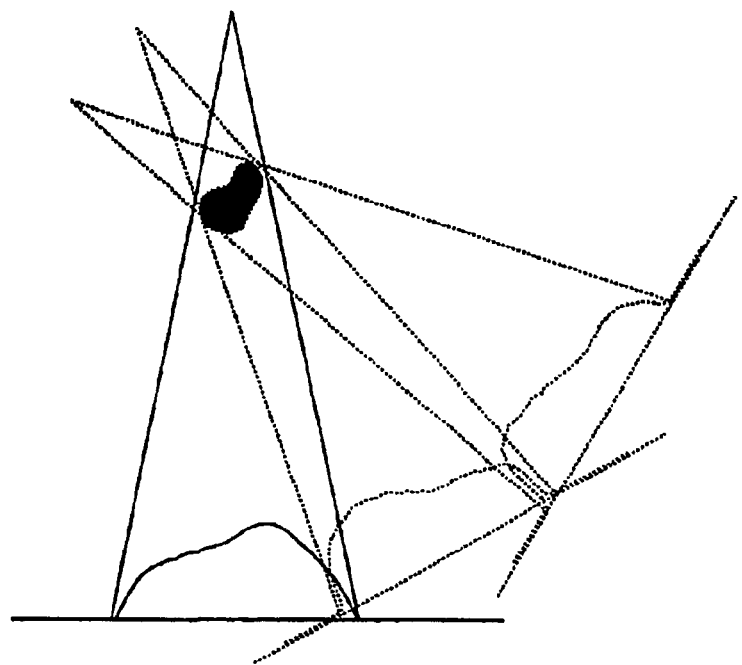
FIG. 3 shows the projection geometry by which the projections are formed from the phantom.

With reference to the drawings, the example illustrates the reconstruction of a 64×64 pixel binary phantom image shown in FIG. 1 using three fan beam projections (raysums) taken at 0, 30 and 60 degrees. The three projections of the binary phantom image are shown in FIG. 2. The projection geometry by which the projections are formed from the phantom image, is illustrated in FIG. 3 of the drawings.

In this example, the projection vectors shown in FIG. 2 are collectively referred to as the projection data. The phantom has two possible density levels which are reflected in the boundary phantom image of FIG. 1 by pixels that are either black or white (but not grey). The two density levels are termed the "prior knowledge".

In order to reconstruct a tomographic image of the phantom, a first estimate of the phantom, F(x,y) is determined using the projection data only. This is achieved by—constraining the projections to the projection data using an iterative update equation method. In this method, the error between the calculated projections of the phantom estimate and the data are repeatedly back-projected onto the phantom estimate so that the error between the projection data and the calculated projections of the phantom estimate decreases. The starting point of the phantom estimate is a blank image. The resultant estimate of the phantom is shown in FIG. 4.

Thereafter, regions in the first phantom estimate image that can be predicted with an acceptable degree of certainty in a final reconstruction of the image, are identified. In other words, those regions in the first phantom estimate image that will resemble a final reconstruction of the image, are identified. FIG. 5 shows a schematic histogram representation of the phantom estimate in FIG. 4 Pixels that should be black according to FIG. 1 form the left hand distribution and pixels that should be white form the right hand distribution. Clearly, in the phantom image of FIG. 4, there are pixels that should be black (F(x,y)=0) that are very light (F(x,y) close to 1). Likewise, there are pixels that should be white that are very dark. However, the majority of the pixels that should be white are light and the majority of the pixels that should be black are dark, as is illustrated by the bumps in the histogram intensity at Intensity I=0 and I=1. This means, for example, that an arbitrary pixel (x,y) with an intensity F(x,y) close to I=0 has a high probability that it should be black in FIG. 1 but it is also possible that it could be white. It is incorrect to assume that a pixel with an intensity very close to I=0 should be black simply because it is more likely to be black than white based solely on its intensity value.

Figure 4:
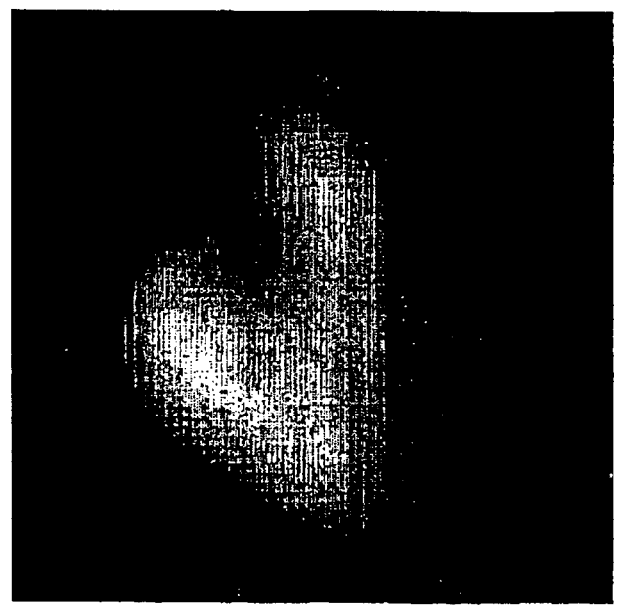
FIG. 4 shows an initial reconstruction of the phantom image.
Figure 5:
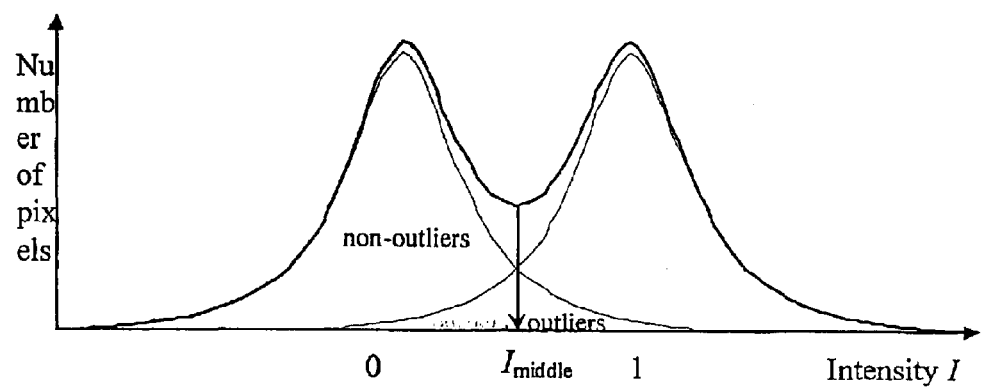
FIG. 5 shows a schematic histogram representation of the initial reconstruction illustrated in FIG. 4.

More particularly, those pixels in FIG. 4 which are "outliers" and those which are not, are identified. As such, a determination is made for which pixels it is true to assume that, simply because the intensities are close to 0 that they should actually be black. Similarly, those pixels are determined with intensities close to 1 where it is true that they should be white. Such pixels referred to as "outliers" are those pixels with intensities close to 0 but which should actually be white according to the binary phantom image as illustrated in FIG. 1 (and also those pixels with intensities close to 1 which should be black).

All pixels with $I=I_{middle}$ are outliers. Pixels with intensities close to $I_{middle}$ have the largest possibility of being outliers rather than being non-outliers. Similarly, pixels with intensities close to 0 or 1 have a very low probability of being outliers.

The method attempts to determine regions in estimate image reconstructions that contain only non-outliers. The complement of these regions contains outliers and also forms regions. In other words, it is assumed that high concentrations of outlier pixels are spatially close together in the estimate image.

The regions in the estimate image reconstruction that contain only non-outliers is determined in the following manner:

1. an intermediate image u(x,y) is created using a formula which is calculated from the phantom estimate image F(x,y):

$u(x,y)=F(x,y)$ if $0<F(x,y)<0.5$ else $u(x,y)=1-F(x,y)$ if $0.5<=F(x,y)<1$ else $u(x,y)=0$ for all other values of F(x,y)

Pixels with intensities close to 0.5 will have high values of u(x,y) and pixels with intensities close to 0 or 1 will have low values. Thus u(x,y) represents the probability that a pixel is an outlier based on the value of its intensity only. However, since we assume that outliers are close to each other (form clusters) in the space domain (x,y) and we do not mind a few non-outliers to be classified as outliers, we can blur u(x,y) using Gaussian blurring kernel to obtain an uncertainty image U(x,y), which is shown in FIG. 5 of the drawings. If outliers are close to each other in the space domain, it does not matter that u(x,y) is blurred.

Figure 7:
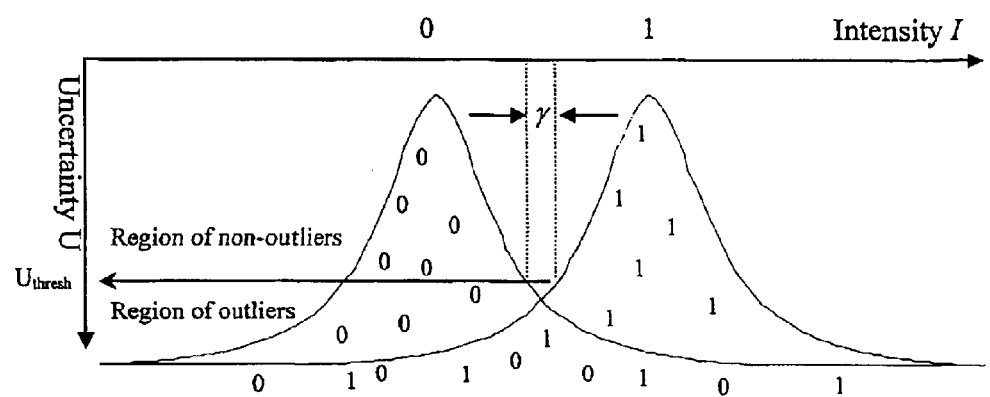
FIG. 7 shows a schematic scattered diagram on an uncertainty-intensity plane for reconstructions of the phantom image.

2. The regions containing only non-outliers is determined by thresholding the uncertainty image U(x,y). Pixels with a low uncertainty have a high probability of being non-outliers and pixels with high uncertainty have a high probability of being outliers. Thus, it is necessary to determine a threshold for U (x,y) wherein we are able to predict with an acceptable level of certainty that all pixels below the threshold are non-outliers. FIG. 7 of the drawings, shows a schematic of a scatter diagram where the pixels of the phantom estimate F(x,y) are plotted on an intensity-uncertainty plane. The threshold level is determined by a safety tolerance margin specified by γ and is read off on the uncertainty axis. Pixels below Uthresh are non-outliers, while pixels above the threshold are outliers (with some non-outliers that may be regarded as outliers). The safety margin γ ensures that outliers are not mistaken for non-outliers.

Figure 6:
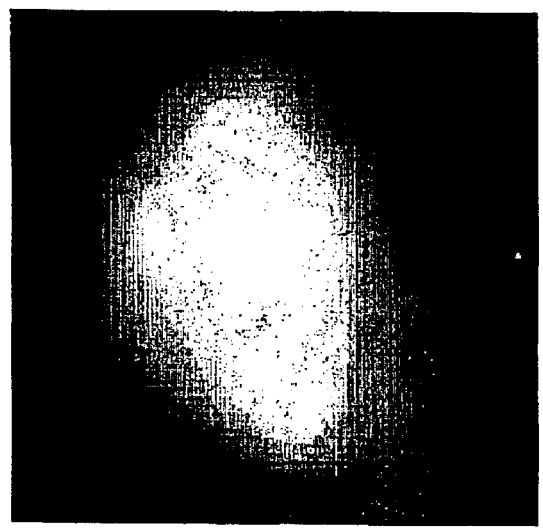
FIG. 6 shows an uncertainty image that is created using a Gaussian Blurring Kernel for thresholding non-outliers in reconstructed images of the phantom.
Figure 8:
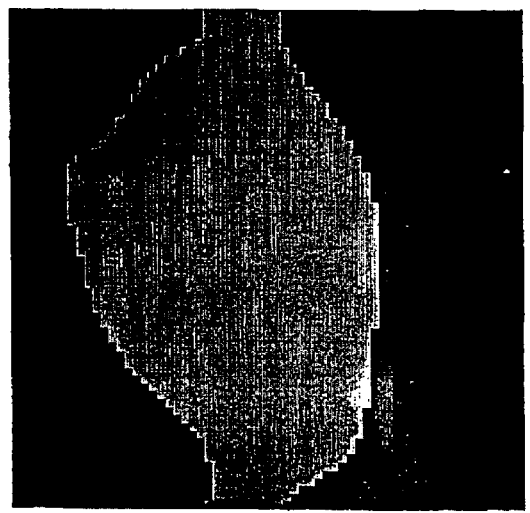
FIG. 8 shows a thresholded image of FIG. 6.
Figure 9:
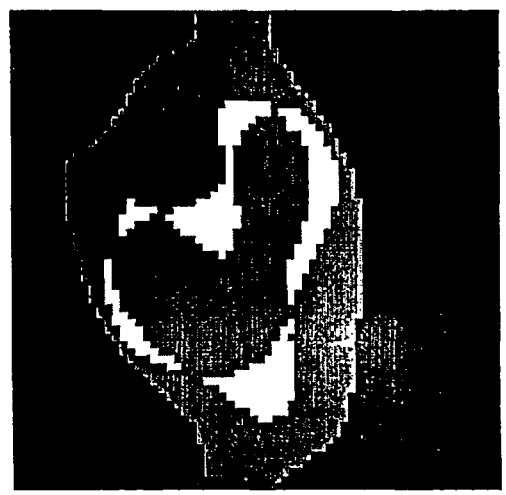
FIG. 9 shows the thresholded image of FIG. 6, also illustrating true outliers.

FIG. 8 shows the result of thresholding the uncertainty image U(x,y) as shown in FIG. 6, by dividing the image into regions of outliers and non-outliers. In FIG. 9, the regions in the image which can be predicted with an acceptable level of certainty (i.e. those regions exclusively containing non-outlier pixels) are indicated by black pixels. The regions in the image which cannot be predicted with an acceptable level of certainty (i.e. those regions containing outliers and non-outliers) are indicated by the white and grey pixels. More particularly, those regions exclusively containing outliers are indicated by white pixels in this image and those regions containing both outliers and non-outliers are indicated by grey pixels.

Thereafter, the prior knowledge is applied exclusively to the non-outlier regions. As such, the non-outlier pixels of the phantom estimate are thresh-holded to be either black or white. The outlier pixels are left alone. Prior knowledge is thus not enforced on outlier pixels. In this manner, a second reconstruction of the phantom estimate image is obtained which is more accurate that the original phantom estimate image obtained using projection data only.

The projection data is again thereafter applied to the phantom estimate image to obtain a third reconstruction of the phantom estimate image. This is necessary because when the prior knowledge constraint was applied partially, i.e. only to the non-outliers, in the previous step, the projections of the phantom estimate would have changed and need to be corrected (i.e. improved) again by an iterative process. With the third reconstruction of the phantom estimate image, one is better able to distinguish between outliers and non-outliers thereby allowing further improvement of the third reconstruction. In the third reconstruction, the region exclusively containing non-outliers will have grown, i.e. more pixels will have been classified as non-outliers. The regions of non-outliers and outliers are then again determined and the prior knowledge applied to the non-outlier regions only, to obtain a fourth reconstruction of the image. This process is repeated until there are no more outliers and the entire image consists of non-outliers.

Figure 10:
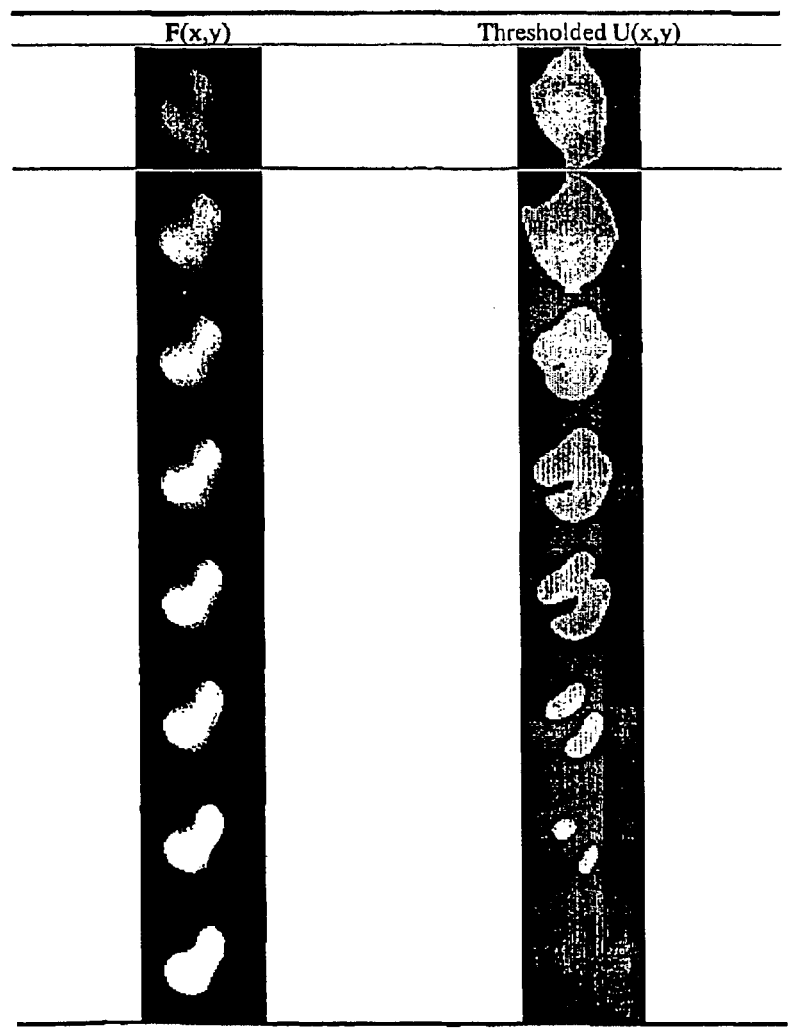
FIG. 10 shows a table illustrating how a region of non-outliers successively changes in reconstructed images of the phantom until a final reconstruction is achieved.

FIG. 10 shows a table illustrating how the regions of non-outliers successfully change during this iteration and in the end contain the whole image.

By identifying non-outlier and outlier regions in reconstructed tomographic images and applying prior knowledge to the non-outlier pixels only, a more accurate final reconstruction is obtained. It will be appreciated that any attempt to apply prior knowledge to outlier pixels will result in poor reconstructions.

Figure 11:
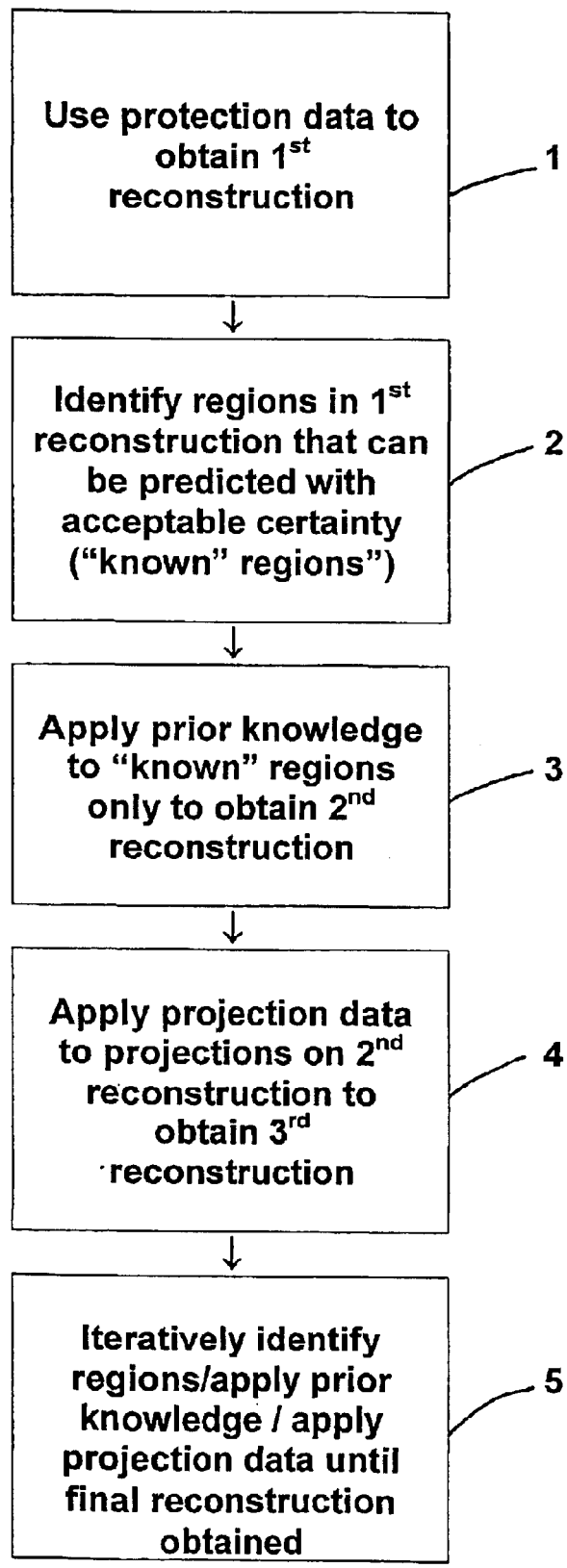
FIG. 11 shows a schematic flow diagram illustrating, in broad outline, the method of reconstructing a tomographic image, in accordance with the invention.

The invention extends to a computer program product for reconstructing a tomographic image of an object from incomplete projection data using a limited angle tomography technique, the computer program product including program instructions for:

using the projection data to obtain a first reconstruction of the image (see block 1 of FIG. 11);

identifying regions in the first reconstruction that can be predicted with an acceptable degree of certainty in a final reconstruction of the image (see block 2 of FIG. 11);

applying prior knowledge only to said regions of acceptable certainty in the first reconstruction of the image, to obtain a second reconstruction of the image which is more accurate than the first reconstruction (see block 3 of FIG. 11);

applying the projection data to projections of the second reconstruction of the image, by constraining the projections to the projection data to obtain a third reconstruction of the image which is more accurate than the second reconstruction (see block 4 of FIG. 11); and iteratively identifying regions in the third reconstruction of the image that can be predicted with an acceptable degree of certainty in a final reconstruction of the image and applying the prior knowledge and the projection data in the same way to the third reconstruction of the image and subsequent reconstructions thereof until a final reconstruction is achieved (see block 5 of FIG. 11). As such, the program instructions are operable to implement the method of reconstructing a tomographic image, as described hereinabove.

The invention also extends to processing means having software executable thereon for reconstructing a tomographic image of an object from incomplete projection data using a limited angle tomography technique, the software being configured to:

use the projection data to obtain a first reconstruction of the image (see block 1 of FIG. 11);

identify regions in the first reconstruction that can be predicted with an acceptable degree of certainty in a final reconstruction of the image (see block 2 of FIG. 11);

apply prior knowledge only to said regions of acceptable certainty in the first reconstruction of the image, to obtain a second reconstruction of the image which is more accurate than the first reconstruction (see block 3 of FIG. 11);

apply the projection data to projections of the second reconstruction of the image, by constraining the projection to the projection data to obtain a third reconstruction of the image which is more accurate than the second reconstruction (see block 4 of FIG. 11); and iteratively identify regions in the third reconstruction of the image that can be predicted with an acceptable degree of certainty in a final reconstruction of the image and apply the prior knowledge and the projection data in the same way to the third reconstruction of the image and subsequent reconstructions thereof until a final reconstruction is achieved (see block 5 of FIG. 11). The software is operable to implement the method of reconstructing a topographic image, as described hereinabove.

What is claimed is:

1. A method of reconstructing a tomographic image of an object from incomplete projection data using a limited angle tomography technique, the method including the steps of:

using the projection data to obtain a first reconstruction of the image;

creating an intermediate image in which each pixel represents the probability that a corresponding pixel of the first reconstruction of the image resembles the corresponding pixel of a final reconstruction of the image;

based on the intermediate image, identifying regions in the first reconstruction of the image that resemble their final reconstruction;

applying prior knowledge only to said regions in the first reconstruction of the image that resemble their final reconstruction, to obtain a second reconstruction of the image which is more accurate than the first reconstruction;

applying the projection data to projections of the second reconstruction of the image by constraining the projections of the second reconstruction of the image to the projection data, to obtain a third reconstruction of the image which is more accurate than the second reconstruction; and iteratively creating intermediate images, identifying regions in the third reconstruction of the image and subsequent reconstructions of the image, that resemble their final reconstruction and applying the prior knowledge and the projection data in the same way to the third reconstruction of the image and subsequent reconstructions thereof until a final reconstruction is achieved.

2. A method as claimed in claim 1, which includes iteratively applying the projection data to projections of reconstructions of the image by constraining the projections to the projection data using an iterative update equation method wherein the resultant error obtained between calculated projections of each reconstruction and the projection data is repeatedly back-projected onto the reconstructions so that the error decreases in subsequent reconstructions of the image.

3. A method as claimed in claim 1 or claim 2, wherein the prior knowledge is applied to reconstructions of the image by thresholding preselected pixels to the closest intensity value.

4. A computer program product for reconstructing a tomographic image of an object from incomplete projection data using a limited angle tomography technique, the computer program product including program instructions for:

using the projection data to obtain a first reconstruction of the image;

creating an intermediate image in which each pixel represents the probability that a corresponding pixel of the first reconstruction of the image resembles the corresponding pixel of a final reconstruction of the image;

based on the intermediate image, identifying regions in the first reconstruction of the image that resemble their final reconstruction;

applying prior knowledge only to said regions in the first reconstruction of the image that resemble their final reconstruction, to obtain a second reconstruction of the image which is more accurate than the first reconstruction;

applying the projection data to projections of the second reconstruction of the image by constraining the projections of the second reconstruction of the image to the projection data, to obtain a third reconstruction of the image which is more accurate than the second reconstruction; and iteratively creating intermediate images, identifying regions in the third reconstruction of the image and subsequent reconstructions of the image, that resemble their final reconstruction and applying the prior knowledge and the projection data in the same way to the third reconstruction of the image and subsequent reconstructions thereof until a final reconstruction is achieved.

5. A computer program product as claimed in claim 4, which includes program instructions for iteratively applying the projection data to projections of reconstructions of the image by constraining the projections to the projection data using an iterative update equation method wherein the resultant error obtained between calculated projections of each reconstruction and the projection data is repeatedly back-projected onto the reconstructions so that the error decreases in subsequent reconstructions of the image.

6. A computer program product as claimed in claim 4 or claim 5, which includes program instructions for applying the prior knowledge to reconstructions of the image, thresholding preselected pixels to the closest intensity value.

7. Processing means having software executable thereon for reconstructing a tomographic image of an object from incomplete projection data using a limited angle tomography technique, the software being configured to:

use the projection data to obtain a first reconstruction of the image;

create an intermediate image in which each pixel represents the probability that a corresponding pixel of the first reconstruction of the image resembles the corresponding pixel of a final reconstruction of the image;

based on the intermediate image, identify regions in the first reconstruction of the image that resemble their final reconstruction;

apply prior knowledge only to said regions in the first reconstruction of the image that resemble their final reconstruction, to obtain a second reconstruction of the image which is more accurate than the first reconstruction;

apply the projection data to projections of the second reconstruction of the image by constraining the projections of the second reconstruction of the image to the projection data, to obtain a third reconstruction of the image which is more accurate than the second reconstruction; and iteratively create intermediate images, identify regions in the third reconstruction of the image and subsequent reconstructions of the image, that resemble their final reconstruction and apply the prior knowledge and the projection data in the same way to the third reconstruction of the image and subsequent reconstructions thereof until a final reconstruction is achieved.

8. Processing means as claimed in claim 7, wherein the software executable thereon is configured to iteratively apply the projection data to projections of reconstructions of the image by constraining the projections to the projection data using an iterative update equation method reconstruction and the projection data is repeatedly back-projected onto the reconstructions so that the error decreases in subsequent reconstructions of the image.

9. Processing means as claimed in claim 7 or claim 8, wherein the software is configured to apply the prior knowledge to reconstructions of the image by thresholding preselected pixels to the closest intensity value.

* * * * *